H. E. SESSIONS.
SEPARATING MECHANISM FOR LINTERS.
APPLICATION FILED DEC. 15, 1914.
1,276,975.
Patented Aug. 27, 1918.
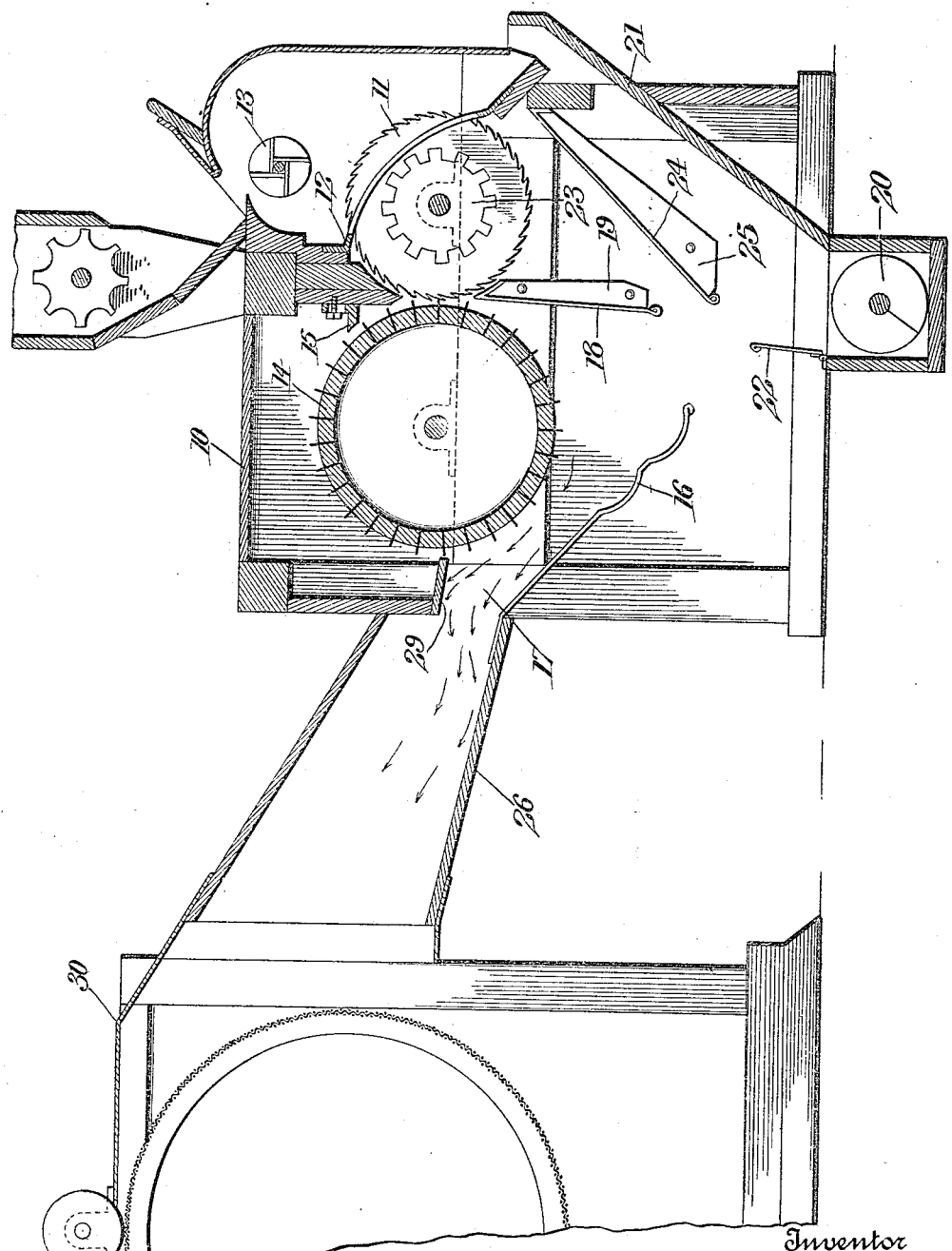

UNITED STATES PATENT OFFICE.

HUGH E. SESSIONS, OF COLUMBIA, SOUTH CAROLINA.

SEPARATING MECHANISM FOR LINTERS.

1,276,975.  Specification of Letters Patent.  Patented Aug. 27, 1918.

Application filed December 15, 1914.  Serial No. 877,442.

*To all whom it may concern:*

Be it known that I, HUGH E. SESSIONS, a citizen of the United States, and resident of Columbia, Richland county, State of South Carolina, have invented certain new and useful Improvements in Separating Mechanism for Linters, of which the following is a specification.

This invention relates to cotton seed linters of the type disclosed in my prior Patents, Nos. 962,722, June 28, 1910, and 1,077,435, November 4, 1913. In the present invention it has been my purpose to secure a more perfect separation of the lint from the motes and at the same time to separate the different kinds of motes which result from delinting cotton seed.

The novel features of my invention will be apparent from the following description, taken in connection with the drawings.

In the drawings, I have shown a section of a delinting machine embodying my invention.

As shown in these drawings, the delinting mechanism is within an outer casing or housing 10 which supports and surrounds the working parts. Within this casing there is a saw cylinder 11, the saws working between the ribs 12 and engaging the seed which are agitated by the rotating float 13. The brush cylinder 14 is parallel to the saw cylinder and the ends of the bristles on this cylinder approach closely the periphery of the saw cylinder at one point, it being understood that the periphery of the brush cylinder moves more rapidly than the periphery of the saw cylinder so as to brush the lint from the saws. An adjustable air regulating board 15 is placed above and between the two cylinders so as to control the passage of the air down between them.

A mote-board 16 is placed below the brush cylinder and is of the type disclosed in my former patents above mentioned, forming a flue leading to the outlet 17 through which the particles of lint pass to a suitable collecting device. As pointed out in my former patents, this construction and arrangement cause a gentle draft down below the brush cylinder where the lint is discharged and the lint is picked up by the air passing through the outlet and is carried away, but the draft is not strong enough to carry off the heavy motes and trash. The air driven down by the brush cylinder strikes the mote-board 16 and some of it turns downward toward the lower edge of the mote-board and on leaving that edge travels across and upward and then to the outlet.

The motes which are discharged by linters of the type disclosed are of two kinds which are called woolly motes which have on them cotton fibers, and what are called sharp motes. According to my present invention, I provide means for separating the woolly motes from the sharp motes. To accomplish this a board 18 is placed in position below the saw cylinder on that side next to the brush cylinder and its upper edge approaches the periphery of the saw cylinder very closely at a point immediately beneath the line where the saw cylinder and the brush cylinder approach each other most closely. This vertically extending board is preferably made of sheet metal with a sharp upper edge and it may be supported on the frames or members 19 secured to the side walls of the casing 10. This separating board extends downward toward the entrance to the flue 17, its lower edge being separated from the lower edge of the mote-board 16. I find that a board arranged as described will separate the woolly motes from the sharp motes and that the woolly motes will pass down the face of the board on that side next to the brush cylinder, whereas the sharp motes will pass over the upper end of the board and will fall at the other side of the board beneath the saw cylinder.

Below the lower edge of the separating board I preferably place a conveyer 20 adapted to receive the sharp motes in addition to the seed discharged from the saws after the lint has been removed. The seed may be directed to this conveyer by means of a guiding board 21. In order to prevent the woolly motes from entering the conveyer, I preferably make use of a division board 22 which is hinged at its lower end and which is therefore adjustable so that its upper edge may be brought into position at the line between the falling sharp motes and the falling woolly motes.

I find that in certain linters, particles of lint will collect in the slots in the saw cylinders as at 23, and these particles will after collecting fall. In order to prevent their loss, I make use of the guide board 24 extending at an angle downwardly to a point approximately beneath the separating board 18, this guide board being preferably made of sheet metal and secured by side flanges or fastening means 25 to the casing 10. This guide board will not only direct the sharp notes down into the conveyer 20 but will also guide the particles of lint dropping from the saw cylinder. When these particles of lint reach the lower edge of the guide board, they will be caught by the current of air passing between the guide board and the separating board and passing below the guide board, and they will be carried up into the outlet flue 17. The sharp motes will pass through the current which carries off these particles of lint.

In my present device, I place the condenser 30 at a somewhat higher level in reference to the linter than in my two prior patents above mentioned and the outlet 17 is made not so large. The condenser is raised three or four inches and the outlet 17 is closed a corresponding amount. The flue 27 extending from the outlet 17 to the condenser is usually made about twenty-four inches in length and in some of the devices heretofore used particles of lint fall to the inside bottom wall 26 of the flue, and collect there to such an extent that sometimes the flue becomes clogged. By my arrangement above indicated, the air passing up over the mote-board 16 to the outlet 17 strikes the upper edge 29 of the outlet and a part of the air current is deflected downward against the inside bottom wall 26 of the flue thus tending to prevent the deposit of lint along that bottom wall and picking up any lint which does fall at that point. This means for causing the air current to strike the bottom wall thus avoids the collection of the lint in the flue and the clogging of the flue.

The flue 27 at the end which joins the linter extends entirely across the machine the length of the brush cylinder, but at its other end where it joins the condenser it is not so wide. In other words, the side walls of the flue approach each other at an angle from the linter toward the condenser. This arrangement has heretofore tended to form cross currents of the air from the sides to the center at the end of the flue next to the condenser and the result has been to carry the heavy particles including any light trash or motes which may be in the lint to the center. These particles would therefore collect on the condenser on a line around the center portion instead of being uniformly distributed over the surface of the condenser. The result of this is that the lint coming from the condenser is not of uniform character, but has a streak in the center of lower grade. By my arrangement above described, causing the air to strike the inside bottom wall of the flue, I avoid this collection of the low grade material at the center of the roll of lint and distribute the material which comes out through the outlet 17 uniformly and consequently the lint on the condenser is of the same quality and character from one end to the other.

Having thus described my invention, what I claim is:

1. In a cotton seed linter, the combination with a saw cylinder of a brush cylinder adapted to remove the lint from the teeth of the saws, a mote board extending downwardly at an angle beneath said brush cylinder forming an outlet flue beneath the brush cylinder, a board having its upper edge closely adjacent to but not extending within the periphery of said saws and extending downwardly opposite the flue entrance formed by said mote board.

2. In a cotton seed linter, the combination with a saw cylinder of a brush cylinder adapted to remove the lint from the teeth of the saws, a mote board extending downwardly at an angle beneath said brush cylinder forming an outlet flue beneath the brush cylinder, a board having its upper edge closely adjacent to but not extending within the periphery of said saws and extending downwardly opposite the flue entrance formed by said mote board, a second board in front of said first board extending downwardly at an angle beneath the saw cylinder leaving an air passage beneath its lower edge.

3. In a cotton seed linter, the combination with a saw cylinder, of a brush cylinder, a mote-board beneath the brush cylinder, forming an outlet flue beneath the brush cylinder, a separating board having its upper edge closely approaching the periphery of said saw cylinder at a point immediately below the line where the brush and saw cylinders most closely approach each other, the said board extending downward opposite the flue entrance but leaving an air passage beneath its lower edge, and an adjustable division board extending upwardly beneath the lower edge of said separating board.

4. In a cotton seed linter, the combination with a saw cylinder, of a brush cylinder, a mote-board beneath the brush cylinder forming an outlet flue beneath the brush cylinder, a separating board having its upper edge closely approaching the periphery of said saw cylinder at a point immediately below the line where the brush and saw cylinders most closely approach each other, the said board extending downward opposite the flue entrance but leaving an air passage beneath its lower edge, a conveyer below the edge of said separating board, means for directing material falling from said saw cylinder to said conveyer, and means for preventing the woolly motes passing down said separating board on the side next to said brush cylinder from entering said conveyer.

5. In a cotton seed linter, the combination with a saw cylinder of a brush cylinder adapted to remove the lint from the teeth of the saws, a mote board extending downwardly at an angle beneath said brush cylinder forming an outlet flue beneath the brush cylinder, a board beneath said saw cylinder extending downwardly and inwardly toward the entrance to said outlet flue and leaving an air passage beneath its lower edge.

6. In a cotton seed linter, the combination with a saw cylinder, of a brush cylinder, a mote-board beneath the brush cylinder forming an outlet flue beneath the brush cylinder, means extending up between said cylinders for separating the woolly motes from the sharp motes discharged by said cylinders, means for causing air passing to said outlet flue to pass through the separated descending sharp motes and woolly motes, and means for separately collecting the said woolly motes and sharp motes.

7. In a cotton seed linter, the combination with a saw cylinder, of a brush cylinder, a mote-board beneath the brush cylinder forming an outlet flue beneath the brush cylinder, an inclined support beneath the saw cylinder extending downwardly toward the lower edge of the mote-board to receive and direct particles of lint falling from between the saws to the lower end of the outlet flue, the said support being so arranged as to provide an air passage at its lower end into which the particles are discharged.

In testimony whereof I affix my signature in presence of two witnesses.

HUGH E. SESSIONS.

Witnesses:
JOHN M. COIT,
ARTHUR L. BRYANT.

Copies of this patent may be obtained for five cents each, by addressing the "Commissioner of Patents, Washington, D. C."